(12) United States Patent
Bray et al.

(10) Patent No.: US 10,046,414 B2
(45) Date of Patent: Aug. 14, 2018

(54) FRICTION WELDING

(71) Applicant: ROLLS-ROYCE PLC, London (GB)

(72) Inventors: Simon E Bray, Derby (GB); Andrew R Walpole, Derby (GB)

(73) Assignee: ROLLS-ROYCE plc, London (GB)

( * ) Notice: Subject to any disclaimer, the term of this patent is extended or adjusted under 35 U.S.C. 154(b) by 159 days.

(21) Appl. No.: 14/991,349

(22) Filed: Jan. 8, 2016

(65) Prior Publication Data
US 2016/0228979 A1    Aug. 11, 2016

(30) Foreign Application Priority Data

Feb. 5, 2015 (GB) .................................. 1501884.9

(51) Int. Cl.
| | |
|---|---|
| *B23K 20/12* | (2006.01) |
| *B23K 20/02* | (2006.01) |
| *B23K 20/24* | (2006.01) |
| *B23K 33/00* | (2006.01) |
| *B23K 101/00* | (2006.01) |

(52) U.S. Cl.
CPC .......... *B23K 20/122* (2013.01); *B23K 20/028* (2013.01); *B23K 20/1205* (2013.01); *B23K 20/129* (2013.01); *B23K 20/24* (2013.01); *B23K 33/00* (2013.01); *B23K 2201/001* (2013.01)

(58) Field of Classification Search
CPC ... B23K 20/1205; B23K 20/129; B23K 33/00
See application file for complete search history.

(56) References Cited

U.S. PATENT DOCUMENTS

| | | | | | |
|---|---|---|---|---|---|
| 2,784,758 | A | * | 3/1957 | Rohe ......................... | F16B 5/01 |
| | | | | | 411/171 |
| 3,762,030 | A | * | 10/1973 | Rajala .................. | B23K 20/129 |
| | | | | | 228/114 |

(Continued)

FOREIGN PATENT DOCUMENTS

| | | |
|---|---|---|
| GB | 1 459 713 A | 12/1976 |
| JP | S63-2576 A | 1/1988 |

(Continued)

OTHER PUBLICATIONS

Nov. 12, 2015 Search Report issued in British Patent Application No. 1501884.9.

(Continued)

*Primary Examiner* — Erin B Saad
*Assistant Examiner* — Carlos J Gamino
(74) *Attorney, Agent, or Firm* — Oliff PLC (57) ABSTRACT

A friction welding process includes: providing a first workpiece having a first weld surface, and a second workpiece having a second weld surface; aligning the workpieces with the weld surfaces facing each other, moving one workpiece relative to the other workpiece, and engaging the first and second weld surfaces such that the movement raises the temperature at the weld surfaces to create a weld interface; and ceasing the movement and allowing the weld interface to cool to weld the workpieces together at the interface. The first workpiece has a plurality of flash removal channels formed in and/or adjacent to the first weld surface. The channels provide pathways for ejection of material from the weld interface during welding.

11 Claims, 5 Drawing Sheets

(56) References Cited

U.S. PATENT DOCUMENTS

| | | | | |
|---|---|---|---|---|
| 4,430,034 | A | * | 2/1984 | Fujikawa ............... B23P 19/062 29/432 |
| 4,636,124 | A | * | 1/1987 | Gugle ................. B29C 65/0672 156/73.5 |
| 4,850,772 | A | * | 7/1989 | Jenkins .............. B23K 35/0288 228/2.3 |
| 5,154,340 | A | | 10/1992 | Peacock |
| 5,795,118 | A | * | 8/1998 | Osada ................ B29C 65/0672 411/171 |
| 7,011,350 | B2 | * | 3/2006 | Stol ...................... B62D 23/005 29/890.043 |
| 2006/0157538 | A1 | | 7/2006 | Crasser |
| 2007/0172335 | A1 | | 7/2007 | Christ |
| 2009/0263207 | A1 | | 10/2009 | Christ |
| 2010/0173161 | A1 | * | 7/2010 | Beehag ............... B29C 65/0627 428/411.1 |
| 2013/0180728 | A1 | | 7/2013 | Hugghins |
| 2016/0023300 | A1 | * | 1/2016 | Kimura ................. B23K 20/12 492/1 |
| 2016/0176103 | A1 | * | 6/2016 | Rousseau ........... B29C 65/0672 403/270 |
| 2016/0368082 | A1 | * | 12/2016 | Li ...................... B23K 20/2275 |

FOREIGN PATENT DOCUMENTS

| | | | | |
|---|---|---|---|---|
| JP | H08-141755 | A | | 6/1996 |
| JP | 2002283068 | A | * | 10/2002 |
| JP | 2004-130367 | A | | 4/2004 |
| JP | 2008-155247 | A | | 7/2008 |
| JP | 2008155247 | A | * | 7/2008 |
| WO | WO 9744154 | A1 | * | 11/1997 ........... B23K 20/127 |
| WO | 2013/058086 | A1 | | 4/2013 |

OTHER PUBLICATIONS

Jun. 14, 2016 extended Search Report issued in European Patent Application No. 16150554.0.

* cited by examiner

FRICTION WELDING

CROSS-REFERENCE TO RELATED APPLICATIONS

This application is based upon and claims the benefit of priority from British Patent Application Number 1501884.9 filed 5 Feb. 2015, the entire contents of which are incorporated by reference.

BACKGROUND

1. Field of the Disclosure

Friction welding is the process for welding together two bodies or workpieces by converting mechanical energy to heat energy by the friction between the engaging weld surfaces of the two workpieces.

2. Description of the Related Art

In rotary friction welding, the process involves effecting relative rotation between the two workpieces while the weld surfaces remain in engagement with each other. In linear friction welding, the process involves effecting relative lateral oscillation between the two workpieces while the weld surfaces remain in engagement with each other.

For example, in inertia rotary friction welding one of two coaxial workpieces is attached to a flywheel, rotated to a predetermined speed and then driven against the second workpiece using thrust supplied by the welding machine. A fixed amount of stored energy in the flywheel (proportional to $rpm^2 \cdot I$, where rpm is the flywheel's predetermined speed and I is its rotational inertia) is thereby converted to heat by friction at the interface of the engaging weld surfaces, which bonds the workpieces together.

The initial contact between the weld surfaces produces a conditioning period in which friction raises the temperature at the interface. This is followed by upsetting when the temperature reaches a high enough level such that softening/melting of the workpiece material allows the workpieces to be pushed together, with liquid or quasi-liquid material being expelled as flash sideways from a plasticised zone at the interface.

A problem can arise, however, that during upsetting the plasticised (liquid or quasi-liquid) material at the interface may not be expelled efficiently as flash, preventing or hindering the removal of interfacial contaminants. As used herein by "flash" we mean not only such expelled material, but also plasticised material at the interface that is desired to be expelled.

A further problem can arise that the distribution of energy input into the weld may not be optimal. For example, in rotary friction welds, the inside diameters of the weld may receive less energy than the outside diameters of the weld due to the differences in relative rotation speed.

OBJECTS AND SUMMARY

It would be desirable to provide a friction welding process which addresses the above problems at least.

Accordingly, in a first aspect there is provided a friction welding process including:
providing a first workpiece having a first weld surface, and a second workpiece having a second weld surface, aligning the workpieces with the weld surfaces facing each other, moving one workpiece relative to the other workpiece, and engaging the first and second weld surfaces such that the movement raises the temperature at the weld surfaces to create a weld interface, and ceasing the movement and allowing the weld interface to cool to weld the workpieces together at the interface;
wherein the first workpiece has a plurality of flash removal channels formed in and/or adjacent to the first weld surface, the channels providing pathways for removal of flash from the weld interface during welding.

Advantageously, by providing such channels, flash (i.e. excess material) can be removed more efficiently. In addition, the channels, when formed in the first weld surface, can provide scraping edges to increase frictional contact between the first and second weld surfaces. In this way, the amount of energy needed for conditioning of the interface can be reduced. Additionally, or alternatively, the channels can be used to vary the pattern of energy input into the weld, e.g. to compensate for a bias or asymmetry in input energy distribution caused by workpiece geometry at the weld surfaces, or to compensate for asymmetry in input energy distribution in rotary friction welds where the inside diameters of the weld surfaces are much less than their outside diameters.

In a second aspect, there is provided the first workpiece of the process of the first aspect. For example, a workpiece can be provided for use in a friction welding process, the workpiece having a weld surface for engagement, on welding, with a corresponding weld surface of a further workpiece, the weld surface having a plurality of flash removal channels formed in and/or adjacent to the first weld surface, the channels providing pathways for removal of flash from the weld interface during welding.

Optional features of the invention will now be set out. These are applicable singly or in any combination with any aspect of the invention.

The process may be a rotary friction welding process, such as an inertia friction welding process. Thus the workpieces may be aligned on a common axis with the weld surfaces facing each other, the one workpiece may be rotated about the axis relative to the other workpiece, and the first and second weld surfaces may be engaged such that the rotation raises the temperature at the weld surfaces to create the weld interface. Further, the rotation may be ceased and the weld interface allowed to cool to weld the workpieces together at the interface.

In a rotary friction welding process, the flash removal channels may be circumferentially distributed. The workpieces may be elongate (e.g. tubular) workpieces, or they may be bar (e.g. solid cylindrical) workpieces. The weld surfaces may be at ends of the respective workpieces. The workpieces may form respective sections of a gas turbine engine rotor disk or respective sections of a shaft of a gas turbine engine spool.

In a rotary friction welding process, the channels, or a portion of the channels, may extend radially, e.g. to the outer radial edges of the first weld surface. The flash removed through the channels can thus be expelled to the outside of the weld interface. In the case of tubular workpieces, the channels, or the portion of the channels, may also extend radially to the inner radial edges of the first weld surface. The radially-extending channels may be shaped as chevrons pointing in the direction of relative rotation of the first workpiece. Such chevron-shaped channels can be particularly efficient at flash removal. Each of the straight-line halves of a given chevron-shaped channel may be angled at about 30 to 60° from the radial direction, although other angles outside this range are possible.

Another option is for the process to be a linear friction welding process. Thus the one workpiece may be oscillated in a direction parallel to the weld surfaces relative to the other workpiece, and the first and second weld surfaces may be engaged such that the oscillation raises the temperature at the weld surfaces to create the weld interface. Further, the oscillation may be ceased and the weld interface allowed to cool to weld the workpieces together at the interface. One of the workpieces (typically the first workpiece) may be a gas turbine engine aerofoil body and the other workpiece may be a gas turbine engine rotor disk. A blisk can thus be formed by welding a circumferential row of such aerofoil bodies to the rotor disk.

Another option is for the process to be an orbital welding process, wherein:

the workpieces are aligned with their respective axes parallel to but radially offset from each other and with the weld surfaces facing each other, the one workpiece is orbited about the axis of other workpiece, and the first and second weld surfaces are engaged such that the orbiting raises the temperature at the weld surfaces to create the weld interface; and the orbiting is ceased and the weld interface allowed to cool to weld the workpieces together at the interface. The one workpiece may additionally rotate about its own axis as well as orbit about the axis of other workpiece.

The channels, or a portion of the channels, may extend into the first workpiece substantially perpendicularly to the first weld surface. Although such channels may eventually become filled with removed flash, they can nonetheless usefully control the initial phase of the weld before becoming ineffective.

Groups of the channels may be formed at different distances from the first weld surface. In this way, "fresh" channels can be exposed as increasing upset removes the channels at the surface.

Likewise, the second workpiece may have a plurality of (e.g. circumferentially distributed) second flash removal channels formed in and/or adjacent to the second weld surface, the second channels providing pathways for removal of flash from the weld interface during welding. Optional features of the first workpiece apply to the second workpiece. For example, at least a portion of the second channels may extend radially to the outer radial edges of the second weld surface, e.g. as radially-extending channels pointing in the direction of relative rotation of the second workpiece. At least a portion of the second channels may extend into the second workpiece substantially perpendicularly to the second weld surface. The second workpiece may have an array of channels formed at different distances from the second weld surface.

BRIEF DESCRIPTION OF THE DRAWINGS

Embodiments will now be described by way of example with reference to the accompanying drawings in which.

DETAILED DESCRIPTION OF EMBODIMENTS

Figure 1:
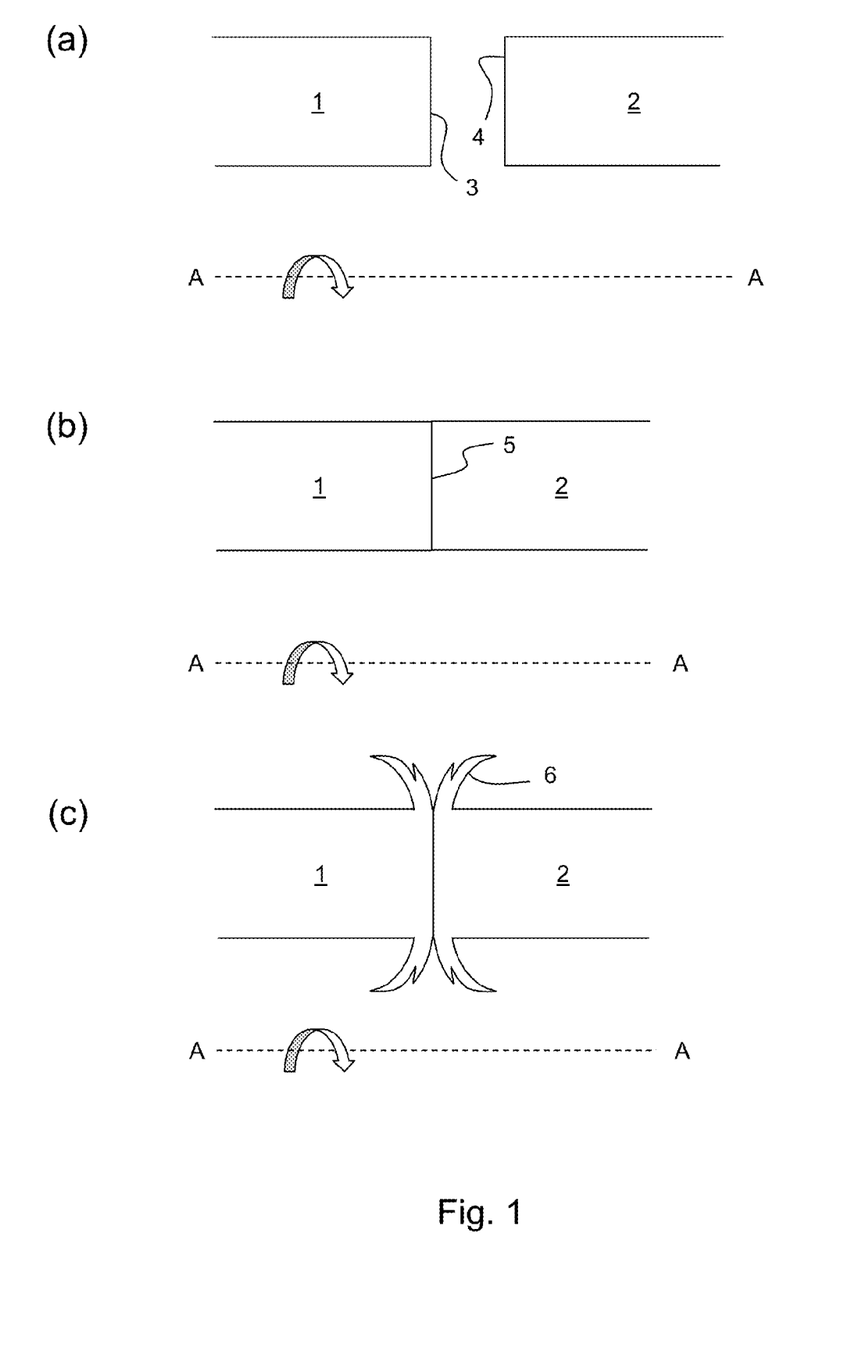
FIG. 1 shows schematically a longitudinal cross-section through a pair of conventional tubular workpieces (a) in readiness to undergo inertia rotary friction welding, (b) after being brought together so that their weld surfaces make contact, and (c) during upsetting.

FIG. 1(a) shows schematically a longitudinal cross-section through a pair of conventional tubular workpieces 1, 2 in readiness to undergo inertia rotary friction welding. The workpieces are aligned on a common axis A-A and have respective end faces forming weld surfaces 3, 4. The left hand workpiece 1 is attached to a flywheel which is rotated at a pre-determined speed, indicated by the solid arrow.

As shown in FIG. 1(b), the workpieces are brought together so that the weld surfaces 3, 4 make contact. During the conditioning period friction raises the temperature at the weld interface 5.

When the temperature at the interface 5 is high enough to sufficiently plasticise the material of the workpieces 1, 2, upsetting progressively pushes the workpieces together and flash 6 is expelled sideways from the interface.

However, the conventional welding process allows undesirable contaminants and other undesirable features to be retained at the weld interface during welding due to inefficient flash expulsion.

Figure 2:
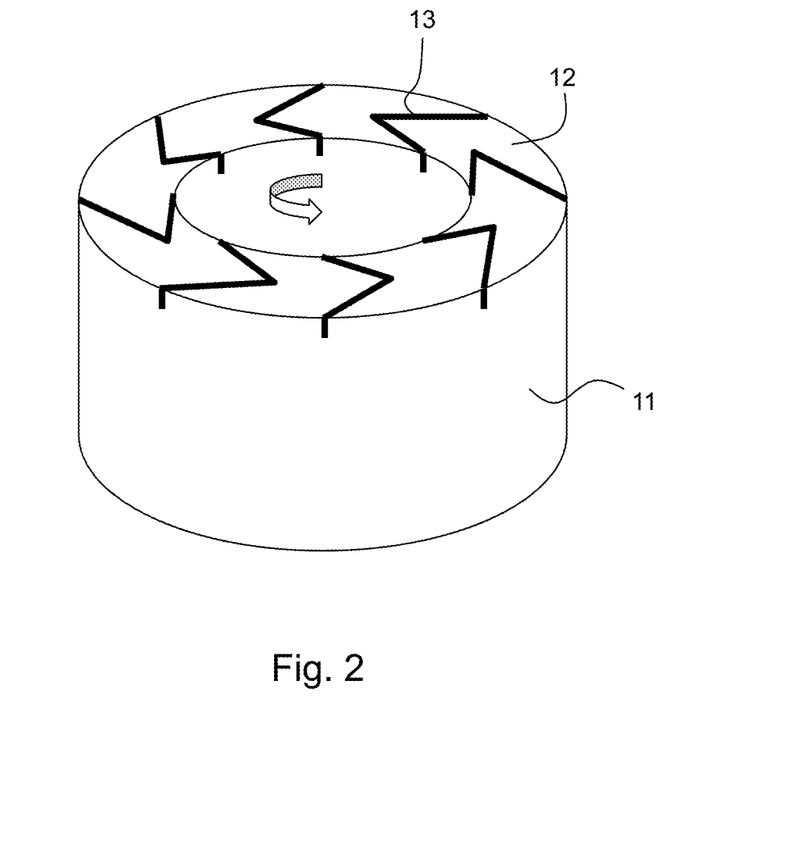
FIG. 2 shows schematically a tubular workpiece.
Figure 3:
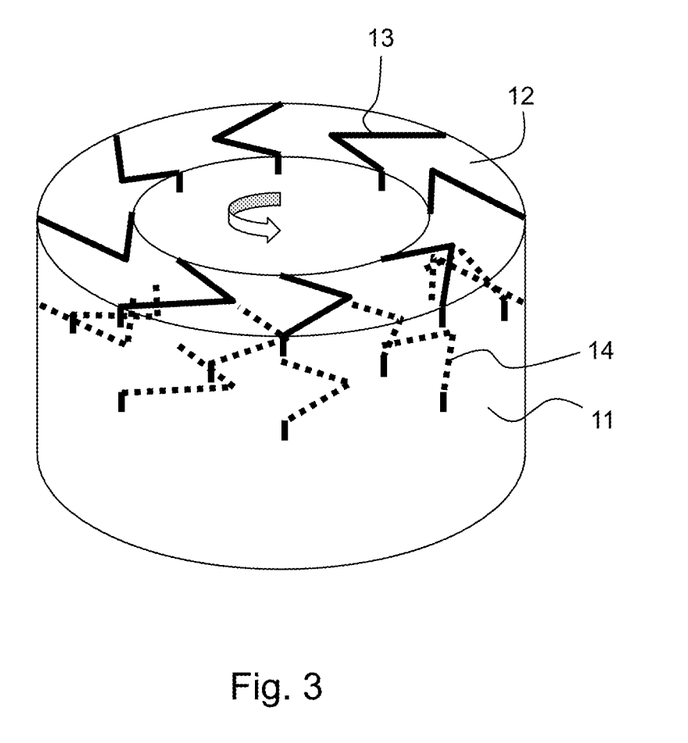
FIG. 3 shows schematically a variant of the tubular workpiece of FIG. 2.

FIG. 2 shows schematically a tubular workpiece 11 according to an embodiment of the present disclosure. The workpiece has a weld surface 12 at its end for joining to the corresponding weld surface of another tubular workpiece. A plurality of circumferentially distributed, radially extending, flash removal channels 13 are formed in the weld surface, for example by milling, drilling, or electro discharge machining. Alternatively, the channels may be formed by building up the weld surfaces of the workpiece by additive material manufacturing. In FIG. 3, the channels are shaped as chevrons pointing in the direction of relative rotation (indicated by the solid arrow) of the workpiece, but any other suitable shape may be used. When the workpiece is used in rotary friction welding (e.g. substituting for one of the workpieces in FIG. 1), the channels provide pathways for efficient removal of flash from the weld interface to the inner and outer radial edges of the weld surface until the channels eventually become consumed by the upset. The channels can be linear, as shown, or curved (e.g. arced or S-shaped) to accommodate the local flow direction.

Each of the straight-line halves of a given chevron-shaped channel may be angled at about 30 to 60° from the radial direction. Asymmetric chevrons may be adopted (i.e. where one straight-line half makes a different angle to the radial direction than the other straight-line half) in view of, for example, variation in thermal and mechanical conditions caused by the different relative rubbing velocities at different radial locations. However, for many weld interfaces, including those with largely uniform thermal and mechanical conditions, symmetric chevrons may be adequate. For example, a typical symmetric chevron-shaped channel has both its straight-line halves at angles of 45° from the radial direction, making the overall chevron angle 90°.

The dimensions of the channels can be determined so that the capacity of the channels to remove liquid or quasi liquid material from the weld interface is approximately equal to the rate at which such material is produced. At any given position along a channel, the depth profile of the channel may be uniform or tapered. Further, the profile shape and/or the channel depth may be constant or may vary along a channel.

While they exist, the channels 13 also help to maintain a high energy input by providing scraping edges which frictionally scrape across the weld surface of the other workpiece. Thus advantageously, higher channel densities can be provided in regions where higher energy inputs are required (e.g. at inner diameter regions having relatively low rubbing velocities).

In order to maintain better control of the welding process, as illustrated in FIG. 3, buried groups of channels 14 can be provided below the welding surface 12, the buried channels coming into play as the channels above them are consumed.

Figure 4:
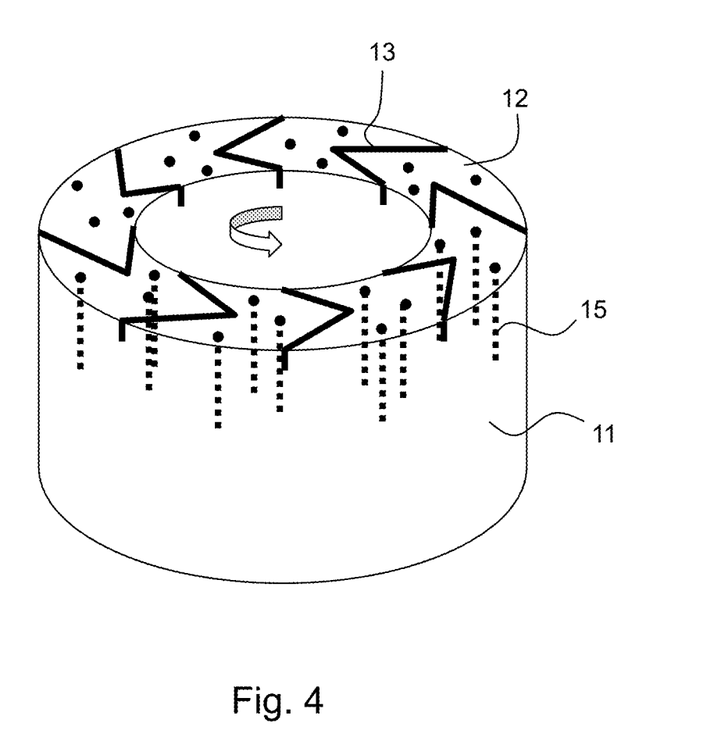
FIG. 4 shows schematically another variant of the tubular workpiece of FIG. 2.

Another option illustrated in FIG. 4, which can be applied separately or in addition to radially-extending channels 13, 14, is to provide channels 15 which extend axially from the weld surface 12 into the workpiece 11. Although such channels eventually fill with flash, they can nonetheless usefully control the initial phase of the weld.

Whatever configuration is adopted for the channels, preferably they occupy a portion of the workpiece whose axial length is proportional to the upset of the workpiece. The channels may be fully consumed by the welding process.

The channels can be provided in just one or both of the rotary friction welding workpieces.

Figure 5:
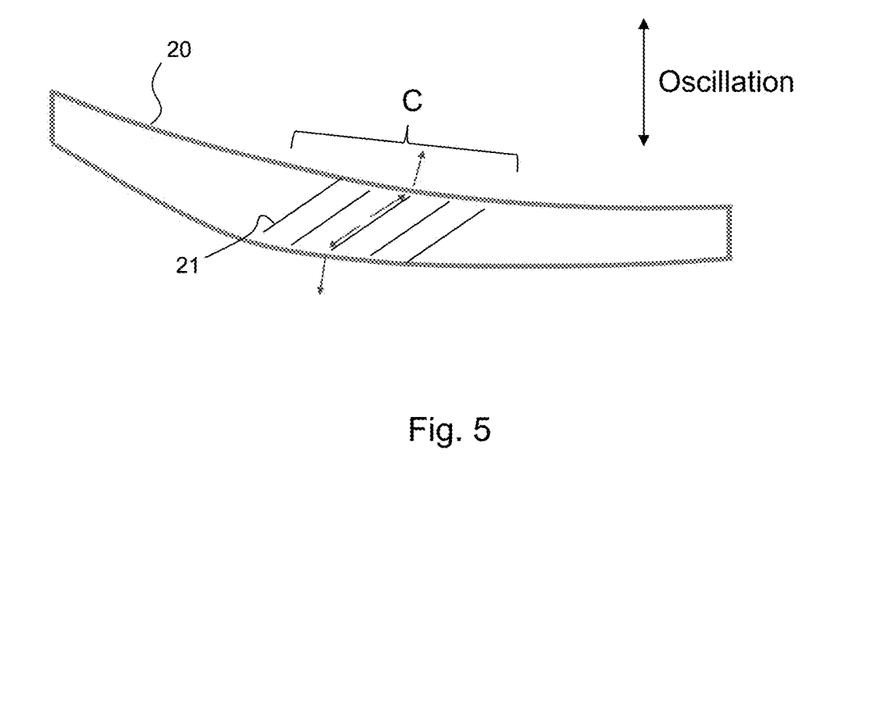
FIG. 5 shows schematically an end face of an aerofoil body for linear friction welding to a rotor disk.

FIG. 5 shows schematically a weld stub end face of an aerofoil body 20 for linear friction welding to a rotor disk (not shown). The linear friction welding oscillation direction is indicated as being in the tangential direction of the disk, but other oscillation directions can be used. The thicker central region C of the end face has an increased bond width and as a consequence can benefit from supplementary frictional heating. Thus this region has a plurality of spaced flash removal channels 21 formed therein. However, more generally, as any selected region of the end face may benefit from improved management of local heat input and/or improved material expulsion, the use of such flash removal channels is not necessarily restricted to the central region C.

Figure 6:
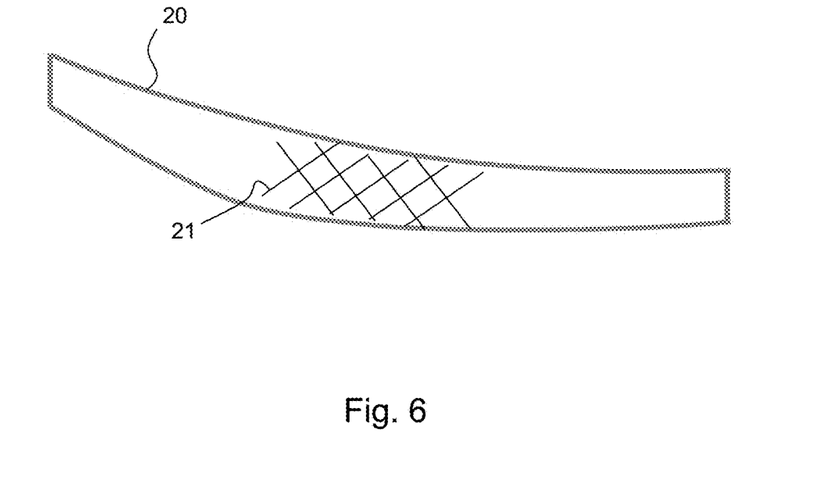
FIG. 6 shows schematically a variant end face of the aerofoil body of FIG. 5.

The channels 21 can be linear, as shown, or curved (e.g. arced or S-shaped) to accommodate the local flow direction. At any given position along a channel, the depth profile of the channel may be uniform or tapered. Further, the profile shape and/or the channel depth may be constant or may vary along a channel. Flash flow along and out of the channels is indicated by the arrows. FIG. 6 shows schematically a variant end face of the aerofoil body of FIG. 5 in which the channels 21 are cross-hatched to increase frictional heating and flow.

While exemplary embodiments have been described above, many equivalent modifications and variations will be apparent to those skilled in the art when given this disclosure. For example, the welding process is not limited to inertia rotary friction welding or linear friction welding, and can be another type of friction welding process such as orbital welding. As another example, the workpieces may be solid bars rather than tubes, and may have axisymmetric or non-axisymmetric geometries. Accordingly, the exemplary embodiments set forth above are considered to be illustrative and not limiting. Various changes to the described embodiments may be made without departing from the spirit and scope of the invention.

We claim:

1. A friction welding process including:
providing a first workpiece having a first weld surface, and a second workpiece having a second weld surface,
aligning the workpieces with the weld surfaces facing each other, moving one workpiece relative to the other workpiece, and engaging the first and second weld surfaces such that the movement raises the temperature at the weld surfaces to create a weld interface, and
ceasing the movement and allowing the weld interface to cool to weld the workpieces together at the interface;
wherein the first workpiece has a plurality of flash removal channels and at least one group is formed in the first weld surface, the channels providing pathways for removal of flash from the weld interface during welding, and
wherein groups of the channels are formed at different distances from the first weld surface.

2. The friction welding process according to claim 1 which is a rotary friction welding process, wherein:
the workpieces are aligned on a common axis with the weld surfaces facing each other, the one workpiece is rotated about the axis relative to the other workpiece, and the first and second weld surfaces are engaged such that the rotation raises the temperature at the weld surfaces to create the weld interface; and
the rotation is ceased and the weld interface allowed to cool to weld the workpieces together at the interface.

3. The friction welding process according to claim 2, wherein the workpieces are elongate workpieces, the weld surfaces being at ends of the respective workpieces.

4. The friction welding process according to claim 2, wherein at least a portion of the channels extend radially to the outer radial edges of the first weld surface.

5. The friction welding process according to claim 4, wherein the radially-extending channels are shaped as chevrons pointing in a direction of relative rotation of the first workpiece.

6. The friction welding process according to claim 1 which is a linear friction welding process, wherein:
the one workpiece is oscillated in a direction parallel to the weld surfaces relative to the other workpiece, and the first and second weld surfaces are engaged such that the oscillation raises the temperature at the weld surfaces to create the weld interface; and
the oscillation is ceased and the weld interface allowed to cool to weld the workpieces together at the interface.

7. The friction welding process according to claim 1 which is an orbital welding process, wherein:
the workpieces are aligned with their respective axes parallel to but radially offset from each other and with the weld surfaces facing each other, the one workpiece is orbited about the axis of the other workpiece, and the first and second weld surfaces are engaged such that the orbiting raises the temperature at the weld surfaces to create the weld interface; and
the orbiting is ceased and the weld interface allowed to cool to weld the workpieces together at the interface.

8. The friction welding process according to claim 1, wherein at least a portion of the channels extend into the first workpiece substantially perpendicularly to the first weld surface.

9. The friction welding process according to claim 1, wherein the second workpiece has a plurality of second flash removal channels formed in and/or adjacent to the second weld surface, the second channels providing pathways for removal of flash from the weld interface during welding.

10. The friction welding process according to claim 1, wherein at least a portion of the plurality of flash removal channels are shaped as chevrons pointing in a direction of relative rotation of the first workpiece.

11. The friction welding process according to claim 1, wherein at least one flash removal channel of the plurality of flash removal channels is a hole with a length that extends into the first workpiece substantially perpendicularly to the first weld surface.

\* \* \* \* \*